United States Patent
Zens

[11] 3,794,347
[45] Feb. 26, 1974

[54] OCCUPANT RESTRAINT SYSTEM
[75] Inventor: John F. Zens, Algonac, Mich.
[73] Assignee: General Motors Corporation, Detroit, Mich.
[22] Filed: May 18, 1972
[21] Appl. No.: 254,698

[52] U.S. Cl. .................................... 280/150 AB
[51] Int. Cl. ............................................ B60r 21/08
[58] Field of Search ............ 280/150 AB; 137/525.1

[56] References Cited
UNITED STATES PATENTS

| | | | |
|---|---|---|---|
| 3,642,303 | 2/1972 | Irish et al. | 280/150 AB |
| 2,998,826 | 9/1961 | Sadler | 137/525.1 X |
| 3,527,472 | 9/1970 | Chute et al. | 280/150 AB |

Primary Examiner—David Schonberg
Assistant Examiner—Terrance L. Siemens
Attorney, Agent, or Firm—Herbert Furman

[57] ABSTRACT

An occupant restraint system includes an inflator which communicates with a manifold. The manifold communicates with one open end of a generally elongated hollow cylindrical diffuser. The diffuser extends between the end plates of a reaction plate assembly and the other closed end of the diffuser is secured to one of the end plates. The diffuser includes two axially extending diametrically opposite flats and two radially spaced rows of slots, one row being in one flat and being divided into spaced groups, and the other row being between the flats. A torso cushion surrounds the diffuser and is fed from the other row of slots. A knee cushion fits within the torso cushion and has slits which are indexed in a predetermined position transversley of respective groups of slots. A planar seal covers the one row of slots and has spaced pairs of slits. The number of pairs is equal to the number of groups of slots. The seal is indexed to the diffuser, but regardless of which side of the seal covers the one row, at least one of the slits of each pair traverses a respective group of diffuser slots and is aligned with a respective cushion slit. An elongated retainer plate within the knee cushion includes louvered openings equal in number to the groups of slots. Fixed studs extending from the plate, one to each side of each such opening, extend through respective aligned openings in the cushion, seal, and diffuser to index the cushion and seal slits to each other and to the groups of respective slots of the diffuser. The studs are threaded to tapped posts which extend through openings in the other flat of the diffuser and engage the inside of the one flat to prevent deformation of the diffuser when the studs are secured to the posts. The openings in the diffuser are irregularly spaced to ensure that the bracket can be installed only one way and that the louvers of the bracket are correctly positioned with respect to the cushion slits. The posts in the diffuser act as baffles and create turbulence in the flow of pressure fluid through the diffuser.

11 Claims, 5 Drawing Figures

OCCUPANT RESTRAINT SYSTEM

This invention relates generally to occupant restraint systems and more particularly to the attachment of an occupant knee cushion to a diffuser.

Occupant restraint systems which include a knee cushion within a torso cushion are known. In such systems, the knee cushion is supplied with pressure fluid from the same diffuser as the torso cushion but through separate slots in the diffuser.

It is also known to provide the knee cushion with a slit which extends transversely of the slots in the diffuser, and to bracket a planar portion of the knee cushion which includes the slit and secure this portion to the diffuser to thereby mount the knee cushion on the diffuser within the torso cushion.

One feature of this invention is that the diffuser includes a number of groups of slots in an axial flat thereof and the knee cushion includes a like number of slits, each respective to a group of slots and indexed in a predetermined transverse position with respect thereto. Another feature is that a thin elongated planar seal is located between the cushion slits and the diffuser slots and indexed to each. The seal includes spaced pairs of slits, each pair being respective to a cushion slit and to a group of diffuser slots. If the seal is indexed with one side thereof over the slots, then one slit of each pair traverses a respective group of slots in a predetermined position and is aligned with a respective cushion slit. If the seal is indexed with the other side thereof over the slots, then the other slit of the pair traverses the same respective group of slots in the same position and is aligned with the same respective cushion slit. Thus, regardless of which way the seal is installed, at least one slit thereof traverses a respective group of diffuser slots and is aligned with a respective cushion slit.

A further feature is that a bracket within the knee cushion includes a number of louvered openings each respective to one of the slits in the cushion. The bracket further includes a peripheral rib for clamping the cushion and seal to the diffuser around the groups of slots to ensure that there is little loss of pressure fluid between the seal and either the cushion or the diffuser.

Yet another feature is that the diffuser includes a second axial flat which is located diametrically opposite the first axial flat and includes axially spaced openings therein which are aligned with openings in the first flat located to each axial side of each group of slots. Headed posts extend through the openings in the second flat and seat against the first flat inside the diffuser. The posts include tapped bores which align with the openings in the first flat. Studs welded to the bracket extend through openings in the cushion and seal and through the openings in the first flat and are received within the tapped bores to thereby clamp the bracket to the diffuser. The posts ensure that the diffuser is not collapsed when the bracket is secured in place and additionally act as baffles to create some turbulence in the flow of pressure fluid through the diffuser.

Yet a further feature is that the openings in the first flat are irregularly spaced to ensure that the bracket can only be installed in one way and that the louvered openings are always positioned correctly with respect to the slits in the cushion.

These and other features of this invention will be readily apparent from the following specification and drawings wherein.

Figure 1:
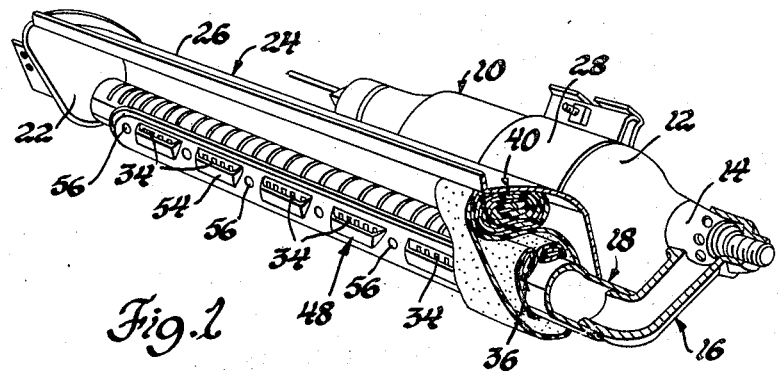
FIG. 1 is a partially broken away perspective view of an occupant restraint system according to this invention.
Figure 2:
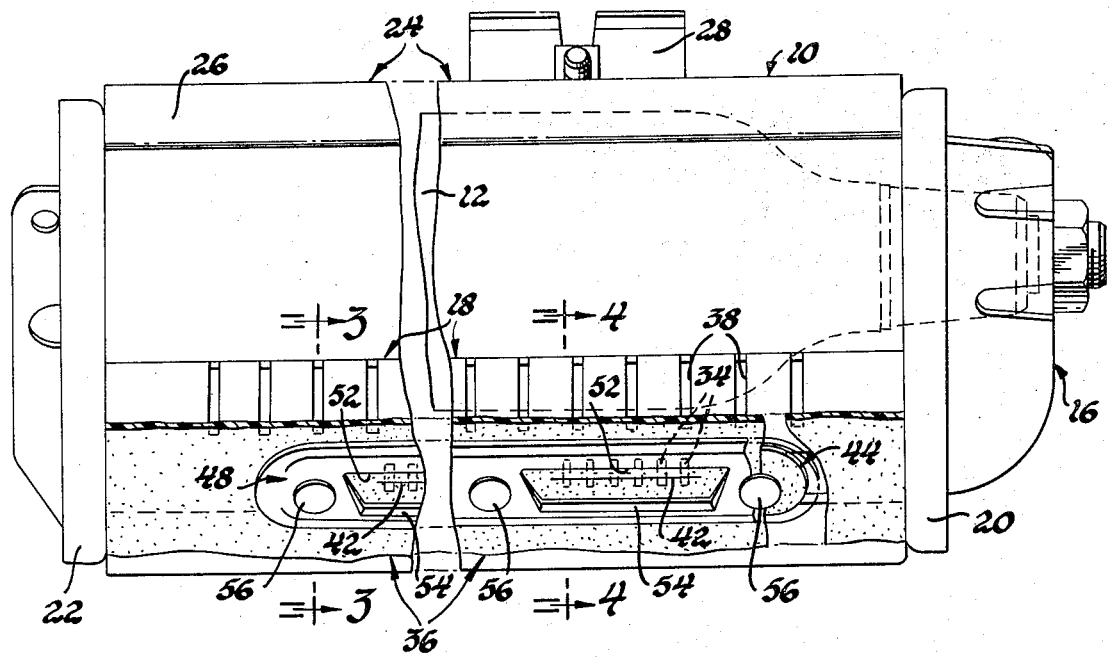
FIG. 2 is an enlarged broken away view of a portion of FIG. 1.

Referring now particularly to FIGS. 1 and 2 of the drawings, an occupant restraint system designated generally 10 according to this invention includes an inflator 12 of the augmented type. The outlet 14 of the inflator communicates across a rupturable seal or diaphragm, not shown, with a manifold 16. The manifold 16 in turn is received within one open end of a generally cylindrical elongated diffuser 18. The diffuser 18 extends between the end plates 20 and 22 of a reaction plate assembly 24 and is indexed to plate 20. The manifold 16 is secured to plate 20 in a suitable manner. The other end of the diffuser is closed in a suitable manner and suitably secured to the end plate 22. A generally arcuate back plate 26 interconnects the plates 20 and 22 and mounts a bracket assembly 28 which provides for mounting of the inflator 12 to the reaction plate assembly. The reaction plate assembly is mounted to the vehicle within the instrument panel in a suitable manner. If desired, reference may be had to application Ser. No. 250,673 (A-17,707), Henry J. Brockman and Lawrence A. Gloomis, filed May 5, 1972 for further details.

Figure 3:
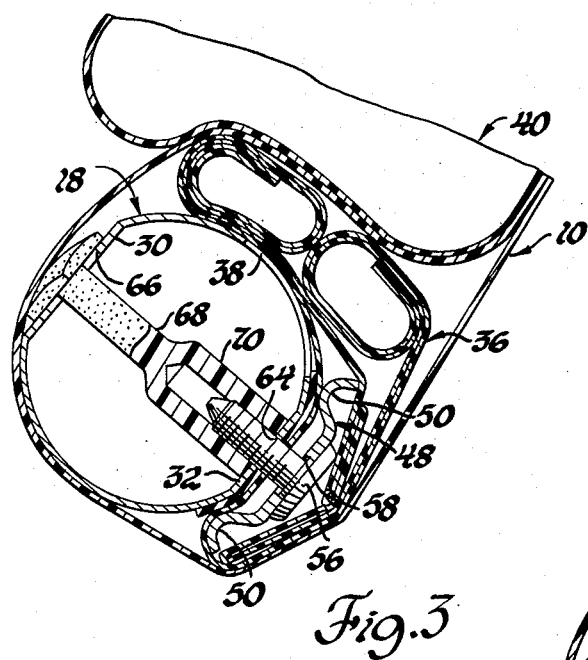
FIG. 3 is an enlarged sectional view taken generally along the plane indicated by line 3—3 of FIG. 2.
Figure 4:
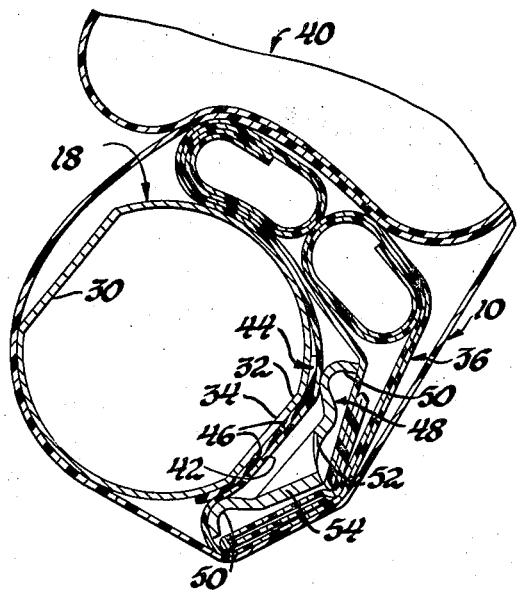
FIG. 4 is an enlarged sectional view taken generally along the plane indicated by line 4—4 of FIG. 1.
Figure 5:
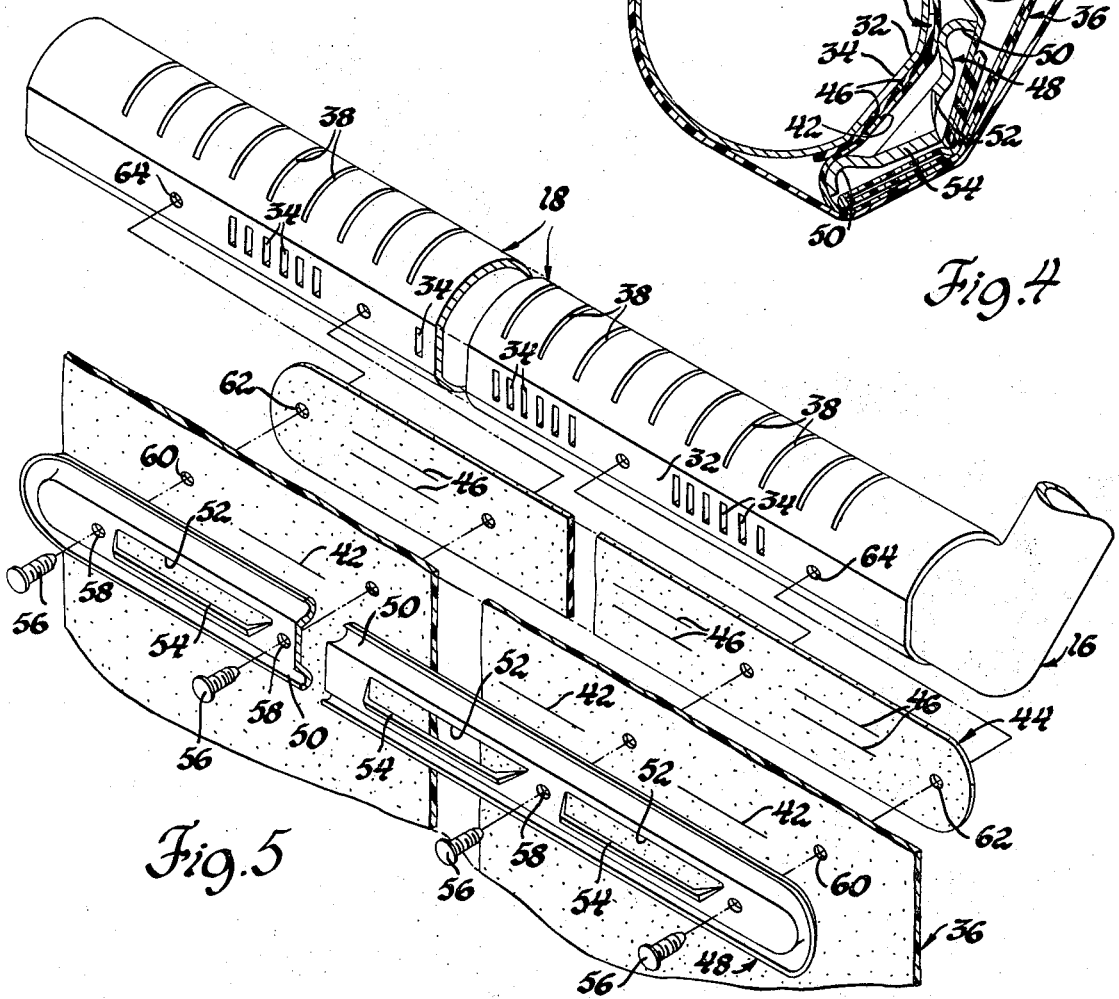
FIG. 5 is an exploded partially broken away view of a portion of FIG. 1.

As best shown in FIGS. 3, 4 and 5, the diffuser 18 includes axially extending flats 30 and 32 which are located generally diametrically opposite of each other. The flat 32 includes five axially spaced groups 34, FIG. 1, of partially circumferentially extending slots. These slots supply the knee cushion 36 with pressure fluid from the diffuser as will be apparent from a further description. The diffuser 18 further includes a second row of axially spaced partially circumferentially extending slots 38, FIG. 1, which supply the torso cushion 40 with pressure fluid from the diffuser as will also be apparent from a further description. The cushions are separately supplied with pressure fluid since the knee cushion normally has no venting provisions while the torso cushion normally has such provisions to limit rebound of the occupant when the occupant engages the cushion. Cole U.S. Pat. No. 3,610,657 may be referred to for further details.

The knee cushion 36 as shown in FIG. 5 includes five spaced aligned slits 42 through the wall thereof, each slit being indexed in a predetermined transverse relationship to a respective group 34 of slots, as will be described. An elongated planar gasket or seal 44 is likewise indexed, as will be described, to the diffuser but can be installed with either side thereof seating on the flat 32 over the groups 34 of slots. The seal includes five spaced pairs of slits 46. At least one slit 46 of each pair must traverse a respective group 34 of slots and must align with a respective slit 42. In the position of the seal 44 shown in FIGS. 4 and 5, the lower slit 46 of each pair aligns with a respective slit 42 and traverses a respective group 34 of slots, whereas if the seal were rotated 180° about its longitudinal axis and installed with the opposite face or side thereof engaging the flat 32, then the upper slit 46 of each pair would become the lower and would traverse a respective group of slots in the same manner as the other slit 46 of the pair. Thus, although the seal can still be installed in either position, at least one of the slits 46 will always traverse a respective group 34 of slots and align with a respective slit 42 regardless of the position of installation.

An elongated bracket 48 of generally the same extent as the seal 44 includes a continuous peripheral arcuate rib 50. The portion of the bracket within the rib is provided with five openings 52, each of which is provided with an integral louver 54 formed from the material of the opening 52. Six threaded studs 56 have their shanks extending through openings 58 in the bracket, with the heads of the studs being welded to the bracket adjacent the openings. The studs extend through openings 60 in the knee cushion 36 and through openings 62 in the seal 44 and through openings 64 in the flat 32 to index the bracket, knee cushion, and seal to the diffuser and in turn index the slits 42 to the openings 52 and the groups 34 of slots and also align one of the slots 46 to each slit 42. It will be noted that the openings 60, 62, and 64 are provided to each side of the respective slits 42 and 46 and respective groups 34 of slots.

As best shown in FIG. 3, the flat 30 is provided with an opening 66 in alignment with each of the openings 64 in the flat 32. When the bracket 48 has been fitted within the knee cushion and the seal 44 assembled to the studs 56, the studs are then inserted through the openings 64 into the interior of the diffuser 18. Headed posts or securing means 68 are then fitted through each opening 66 and the tapped free ends 70 thereof are assembled to the studs 56 so that the rib 50 of the bracket tightly clamps the knee cushion and the seal to each other and to the diffuser 18 around the respective slits and groups of slots. This ensures that no pressure fluid will be lost between the diffuser and the seal and likewise between the seal and the knee cushion.

It will be noted with respect to FIG. 3 that the tapped ends 70 of the posts 68 seat on the inner surface of the flat 32. Thus, as the posts are threaded on the studs 56, the free ends 70 thereof will engage the flat 32 and maintain the diametrical relationship of this flat to the flat 30 without in any manner collapsing or deforming the diffuser 18.

It should also be noted that the openings 64 in the flat 32 are irregularly spaced and that the studs 56 are likewise irregularly spaced. This ensures that the louvered openings 52 will always be correctly positioned so as to deflect the flow of pressure fluid into the cushion from the slits 42 in the desired direction. While the irregular spacing permits the seal to be installed in either of two positions, as previously described, the slits 46 will still be aligned with respective slits 42.

The torso cushion 40 is attached in a conventional manner to the diffuser 18 and when this cushion is in a stored position within the reaction plate assembly 24, it is located generally above the diffuser and within the confines of the arcuate back plate 26 between the end plates 20 and 22. The knee cushion 36 as shown in FIGS. 1, 3 and 4 is double-roll folded upon itself within the torso cushion 40 and located between the torso cushion and the diffuser.

When the pressure fluid is supplied from the inflator 12 to the diffuser 18, it will flow through the slots 38 into the torso cushion and initiate inflation of this cushion. Likewise it will flow through the groups 34 of slots, through respective aligned slits 42 and 46 and thence through the opening 52 into the knee cushion to initiate inflation and unrolling of the knee cushion, with the flow of pressure fluid through the openings 52 being directed by the louvers 54.

Thus, this invention provides an improved occupant restraint system.

I claim:

1. An occupant restraint system comprising, in combination, a source of pressure fluid, an annular diffuser communicable with the source for receipt of pressure fluid therefrom and including a plurality of axially spaced partial circumferentially extending slots providing a pressure fluid outlet from the diffuser, flexible sealing means seating on the diffuser and including a slit therein extending transversely of the slots, an occupant restraint cushion of flexible material having a wall portion thereof seating on the sealing means and including a slit extending transversely of the slots and receiving pressure fluid therefrom through the sealing means slit, bracket means enclosing the portion of the wall of the cushion including the slit, and means extending generally diametrically through the diffuser and interconnecting the bracket means and the diffuser through the cushion and sealing means.

2. An occupant restraint system comprising, in combination, a source of pressure fluid, an annular diffuser communicable with the source for receipt of pressure fluid therefrom and including a plurality of axially spaced groups of partial circumferentially extending slots, each providing a pressure fluid outlet from the diffuser, flexible sealing means seating on the diffuser and including a plurality of slits therein, each extending transversely of a respective group of slots, an occupant restraint cushion of flexible material including a plurality of slits in the wall thereof, each respective to one of the sealing means slits and extending transversely of a respective group of slots, bracket means enclosing the portion of the wall of the cushion including the slits, and means extending generally diametrically through the diffuser and interconnecting the bracket means and the diffuser and extending through the cushion and sealing means at the ends of the slits.

3. An occupant restraint system comprising, in combination, a source of pressure fluid, an annular hollow diffuser communicable with the source for receipt of pressure fluid therefrom and including a group of axially spaced partial circumferentially extending slots providing a pressure fluid outlet from the diffuser, baffle means extending transversely through the diffuser to each side of the group of slots, flexible sealing means seating on the diffuser and including a slit therein extending transversely of the slots, an occupant restraint cushion of flexible material having a wall portion thereof seating on the sealing means and including a slit extending transversely of the slots and receiving pressure fluid therefrom through the sealing means slit, bracket means enclosing the portion of the wall of the cushion including the slit, and means interconnecting the bracket means and the baffle means through the cushion and sealing means.

4. An occupant restraint system comprising, in combination, a source of pressure fluid, a hollow generally cylindrical diffuser communicable with the source for receipt of pressure fluid therefrom and including a group of axially spaced partial circumferentially extending slots providing a pressure fluid outlet from the diffuser, a post extending diametrically of the diffuser to each side of the group, flexible sealing means seating on the diffuser and including a slit therein extending transversely of the slots, an occupant restraint cushion of flexible material having a wall portion thereof seating on the sealing means and including a slit extending transversely of the slots and receiving pressure fluid therefrom through the sealing means slit, bracket means enclosing the portion of the wall of the cushion including the slit, and means interconnecting the bracket means and the posts through the cushion and sealing means, and clamping the cushion and sealing means to the diffuser.

5. An occupant restraint system comprising, in combination, a source of pressure fluid, a generally cylindrical hollow diffuser communicable with the source for receipt of pressure fluid therefrom and including axially extending generally diametrically opposite flats and a group of axially spaced partial circumferentially extending slots in one flat providing a pressure fluid outlet from the diffuser, a flexible seal seating on the one flat over the slots and including a slit therein extending transversely of the slots, an occupant restraint cushion of flexible material having a wall portion thereof seating on the seal and including a slit extending transversely of the slots and receiving pressure fluid therefrom through the seal slit, means interconnecting the flats and blocking movement of the flats toward each other, bracket means enclosing the portion of the wall of the cushion including the slit, and means securing the bracket means to the interconnecting means through the cushion and seal.

6. An occupant restraint system comprising, in combination, a source of pressure fluid, a generally cylindrical hollow diffuser communicable with the source for receipt of pressure fluid therefrom and including a group of axially spaced partial circumferentially extending slots providing a pressure fluid outlet from the diffuser, a flexible seal seating on the exterior of the diffuser over the slots and including a slit therein extending transversely of the slots, an occupant restraint cushion of flexible material having a portion thereof seating on the seal and including a slit extending transversely of the slots and receiving pressure fluid therefrom through the seal slit, bracket means enclosing the portion of the cushion includes the slit, securing means extending generally diametrically through the diffuser and terminating adjacent the inner surface thereof to each side of the group of the slots, and means attaching the bracket means to the securing means through the cushion, seal and diffuser.

7. An occupant restraint system comprising, in combination, a source of pressure fluid, a generally cylindrical hollow diffuser communicable with the source for receipt of pressure fluid therefrom and including axially spaced rows of openings, each row being aligned with the other row generally diametrically of the diffuser, a group of axially spaced partial circumferentially extending slots between each successive pair of openings of one row and providing pressure fluid outlets from the diffuser, a seal covering the groups of slots and including slits therein, each extending transversely of a group of slots, an occupant restraint cushion having a portion thereof seating on the seal and including slits therein, each extending transversely of a group of slots and receiving pressure fluid therefrom through a respective seal slit, bracket means enclosing the portion of the cushion including the slits, and means extending through the aligned openings of each row and securing the bracket means to the diffuser through the cushion and seal.

8. An occupant restraint system comprising, in combination, a source of pressure fluid, a generally cylindrical hollow diffuser communicable with the source for receipt of pressure fluid therefrom and including axially spaced rows of openings, each row being aligned with the other row extending generally diametrically of the diffuser, a group of axially spaced partial circumferentially extending slots between each successive pair of openings of one row providing pressure fluid outlets from the diffuser, a seal covering the groups of slots and including slits therein, each extending transversely of a group of slots, an occupant restraint cushion having a portion thereof seating on the seal and including slits therein, each extending transversely of a group of slots and receiving pressure fluid therefrom through a respective seal slit, bracket means enclosing the portion of the cushion including the slits, a headed securing member respective to each pair of aligned openings, the members having the heads thereof seating on the diffuser and extending through the openings of the other row adjacent the openings of one row, and means securing the bracket means to the securing members through the cushion, seal, and one row of openings.

9. An occupant restraint system comprising, in combination, a source of pressure fluid, a generally cylindrical hollow diffuser communicable with the source for receipt of pressure fluid therefrom and including axially extending generally diametrically opposite flats, each provided with a row of spaced openings, the openings being arranged in aligned pairs, a group of axially spaced partial circumferentially extending slots between each spaced pair of openings in one flat and providing pressure fluid outlets from the diffuser, a seal seating on the one flat over the groups of slots and including a plurality of groups of slits, each slit therein extending transversely of a group of slots, an occupant restraint cushion having a portion thereof seating on the seal and including a plurality of slits therein, each slit extending transversely of a group of slots and receiving pressure fluid therefrom through a respective seal slit, a plurality of securing members, each respective to an aligned pair of slots and including a head seating on the diffuser and a body extending through a respective opening of the other row to adjacent a respective opening of the one row and including a threaded bore aligned with the latter opening, and threaded members extending through the bracket means, cushion, seal, and openings of the one row into the threaded bores of the securing members to attach the bracket means, cushion and seal to the diffuser, the bodies of the securing members engaging the inner surface of the diffuser adjacent the one row of openings to block collapse of the diffuser upon threaded attachment of the securing members and threaded members.

10. An occupant restraint system comprising, in combination, a source of pressure fluid, an annular diffuser communicable with the source for receipt of pressure fluid therefrom and including a plurality of axially spaced groups of partial circumferentially extending slots, each providing a pressure fluid outlet from the diffuser, flexible sealing means seating on the diffuser over each group of slots and including a plurality of slits therein, each extending transversely of a respective group of slots, an occupant restraint cushion of flexible material including a plurality of slits in the wall thereof, each respective to one of the sealing means slits and extending transversely of a respective group of slots, bracket means enclosing the portion of the wall of the cushion including the slits, securing means mounted on the diffuser to each side of each group and being axially irregularly spaced with respect to each other, and means interconnecting the bracket means and the securing means through the cushion and sealing means, the irregular spacing of the securing means allowing only one position of the bracket means with respect to the diffuser.

11. An occupant restraint system comprising, in combination, a source of pressure fluid, an annular diffuser communicable with the source for receipt of pressure fluid therefrom and including a plurality of axially spaced partial circumferentially extending slots providing a pressure fluid outlet from the diffuser, a flexible planar seal positionable on the diffuser with either side thereof covering the slots and including a pair of slits, at least one extending transversely of the slots regardless of the seated position of the seal, an occupant restraint cushion of flexible material including a slit in the wall thereof extending transversely of the slots, bracket means enclosing the portion of the wall of the cushion including the slits, and means interconnecting the bracket means and the diffuser and extending through the cushion and seal to each axial side of the respective slits.

* * * * *